United States Patent
Diwakar et al.

(10) Patent No.: US 10,634,089 B2
(45) Date of Patent: Apr. 28, 2020

(54) DIESEL PISTON WITH SHARP-STEP PROFILE

(71) Applicant: GM GLOBAL TECHNOLOGY OPERATIONS LLC, Detroit, MI (US)

(72) Inventors: Ramachandra Diwakar, Troy, MI (US); Vicente Domenech-Llopis, Pontiac, MI (US); Richard C Peterson, Troy, MI (US); Alberto Lorenzo Vassallo, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/838,648

(22) Filed: Dec. 12, 2017

(65) Prior Publication Data

US 2019/0178203 A1 Jun. 13, 2019

(51) Int. Cl.
*F02F 3/02* (2006.01)
*F02B 23/06* (2006.01)

(52) U.S. Cl.
CPC .......... *F02F 3/027* (2013.01); *F02B 23/0687* (2013.01)

(58) Field of Classification Search
CPC .............. F02B 23/0696; F02B 23/0693; F02B 23/0687; F02F 3/00; F02F 3/28; F02F 3/045; F02F 3/12
See application file for complete search history.

(56) References Cited

U.S. PATENT DOCUMENTS

| | | | | |
|---|---|---|---|---|
| 4,510,895 A | * | 4/1985 | Slee | F02B 23/0603 123/193.6 |
| 5,660,156 A | * | 8/1997 | Whitacre | B22D 19/0027 123/193.6 |
| 6,314,933 B1 | * | 11/2001 | Iijima | F02B 23/0696 123/193.6 |
| 7,389,764 B1 | | 6/2008 | Wickman et al. | |
| 7,415,963 B2 | * | 8/2008 | Chmela | F02B 23/0669 123/276 |
| 8,156,927 B2 | * | 4/2012 | Iikubo | F02B 23/0672 123/661 |
| 9,476,346 B2 | * | 10/2016 | Zoeller | F02B 23/0693 |

(Continued)

OTHER PUBLICATIONS

U.S. Appl. No. 15/436,856, filed Feb. 19, 2017 by GM Global Technology Operations LLC.

(Continued)

*Primary Examiner* — Long T Tran

(57) ABSTRACT

A piston for a diesel engine includes a piston body having a skirt and crown. The piston body has portions defining an outer combustion bowl and an inner combustion bowl within the piston body through the crown. The outer combustion bowl has a curved annular side wall extending from the crown surface and an annular flat shelf extending from the curved annular side wall. The new stepped bowl design integrates a bottom profile with smoothly varying curvature and a sharp step at the top. The annular flat shelf is recessed a distance in the range of 2.5-4.5 millimeters from a line coplanar with the crown surface. The piston body defines an outer convex curved surface connecting the curved annular side wall to the crown surface. The outer convex curved surface has a radius of curvature in the range of 0.25-0.75 millimeter.

20 Claims, 2 Drawing Sheets

(56) References Cited

U.S. PATENT DOCUMENTS

| | | | |
|---|---|---|---|
| 2004/0123832 A1* | 7/2004 | Quigley | F02B 23/0672 123/276 |
| 2005/0115537 A1* | 6/2005 | Liu | F02B 23/0672 123/276 |
| 2006/0090726 A1* | 5/2006 | Meffert | F02B 23/0672 123/279 |
| 2011/0259297 A1* | 10/2011 | Rothbauer | F02B 23/0651 123/276 |
| 2011/0271931 A1* | 11/2011 | Rothbauer | F02B 23/0636 123/279 |
| 2015/0308371 A1* | 10/2015 | Eismark | F02B 23/0627 123/193.6 |
| 2016/0138517 A1* | 5/2016 | Katari | F02B 23/06 123/193.6 |

OTHER PUBLICATIONS

Jaaskelainen, Khair, "Combustion Systems" DieselNet.com Revision Nov. 2016, DieselNet Technology Guide, available at https://www.dieselnet.com/tech/engine_combustion.php, printed on Aug. 17, 2017, 34 pages.

* cited by examiner

DIESEL PISTON WITH SHARP-STEP PROFILE

FIELD

The present disclosure relates to a diesel piston having an outer combustion bowl and an inner combustion bowl for improved emissions, reduced fuel consumption, and higher power output.

INTRODUCTION

Diesel emissions are heavily regulated by federal governments. Accordingly, diesel systems designers have developed several improvements in diesel systems to reduce emissions. For example, enhanced air system designs provide higher rates of cooled EGR (exhaust gas recirculation), thereby reducing $NO_x$ emissions, and enhanced fuel injection systems reduce the inevitably higher soot emissions that would result from the use of higher EGR rates. Also, combined soot and $NO_x$ emissions after-treatment systems reduce emissions from diesel engines. Exhaust after treatment systems, however, can be costly.

In addition, soot resulting from combustion may be deposited on portions of the combustion chamber and may transfer to the engine oil system, thereby contaminating the oil. Exhaust after-treatment systems do nothing to stop the transfer of soot into the engine oil, as it occurs upstream of the exhaust after-treatment system.

SUMMARY

The present disclosure provides an improved diesel engine combustion bowl design that allows for enhanced mixing of combustion products with excess air available in the cylinder, simultaneously reducing soot and $NO_x$ emissions. More particularly, the present disclosure provides a piston having an improved stepped bowl design. The new stepped bowl design integrates a bottom profile with smoothly varying curvature and a sharp step at the top. The novel piston generates robust turbulent vortices due to spray-bowl interaction, which enhances in-cylinder air fuel mixing, resulting in faster combustion, lower emissions, and extremely low levels of soot contamination in the engine oil.

In some forms, the lower (or inner) bowl has a re-entrant, compact shape with smoothly varying curvature for improving mixing and low heat rejection at low loads. The upper (or outer) bowl may have flat and sharp-step surfaces for enhanced mixing and efficient air utilization and minimal liner-soot contact at high loads.

In one form, which may be combined with or separate from the other forms disclosed herein, a piston for a diesel engine is provided that includes a piston body having a skirt extending from a proximal end of the piston body and a crown disposed at a distal end of the piston body. The crown defines a crown surface. The piston body has portions defining an outer combustion bowl and an inner combustion bowl within the piston body through the crown. The outer combustion bowl has a curved annular side wall extending from the crown surface and an annular flat shelf extending from the curved annular side wall. The annular flat shelf is recessed a distance in the range of 2.5 to 4.5 millimeters from a line coplanar with the crown surface. The inner combustion bowl is recessed with respect to the annular flat shelf of the outer combustion bowl. The piston body defines an outer convex curved surface connecting the curved annular side wall to the crown surface. The outer convex curved surface has a radius of curvature in the range of 0.25 to 0.75 millimeter.

Further additional features may be provided, including but not limited to the following: the curved annular side wall having a concave curved shape; the annular flat shelf being recessed a distance of about 3.5 millimeters from the line coplanar with the crown surface; the radius of curvature of the outer convex curved surface being about 0.5 millimeter; the piston body defining an annular valley surface forming the inner combustion bowl; the piston body defining an inner convex curved surface connecting the annular flat shelf of the outer combustion bowl to the annular valley surface of the inner combustion bowl; the inner convex curved surface having a radius of curvature in the range of 1 to 2 millimeters; the radius of curvature of the inner convex curved surface being about 1.5 millimeters; a radial distance between the annular flat surface and the crown surface being in the range of 1.5 to 2 millimeters, the radial distance being measured along a line perpendicular to the central axis; the inner combustion bowl having a lowest point that is 12 to 14 millimeters from the line coplanar with the crown surface; the inner combustion bowl having a radially outermost point that is 24 to 27 millimeters from a central axis of the piston body; a center of the inner combustion bowl being disposed 5 to 7 millimeters from the line coplanar with the crown surface; the center being located along the central axis of the piston body; a radially innermost point of the inner convex curved surface being disposed 23 to 25 millimeters from the central axis; the radially innermost point of the inner convex curved surface being disposed radially inward of the radially outermost point of the inner combustion bowl by a radial distance of 1 to 2 millimeters, the radial distance being measured along a line perpendicular to the central axis; the outer convex curved surface being disposed a distance of 8 to 10 millimeters from an outer edge of the crown; the annular flat shelf having a radial length extending from the outer convex curved surface to the inner convex curved surface, the radial length being 7 to 8 millimeters; the curved annular side wall extending from the crown surface at an angle between 100 and 110 degrees.

Further additional features may be provided, including but not limited to the following: the piston body having a three-dimensional shape defined in an x-y-z coordinate space, the z-axis being disposed along the central axis of the piston body and intersecting the line coplanar with the crown surface at 90 degrees, the inner and outer combustion bowls being defined by a two-dimensional cross-sectional profile line that begins at the central axis and ends along the crown surface to define a half cross-section of the piston body, the half cross-section being rotatable about the z-axis to form the three-dimensional shape of the piston body. The two-dimensional cross-sectional profile line may connect coordinate points $(x_i, y_i, z_i)$ or coordinate points $(fx_i, fy_i, fz_i)$, f being any positive multiplier, in the x-y-z coordinate space, the coordinate points $(x_i, y_i, z_i)$ including selected points that substantially coincide with a coordinate set S. The coordinates of the coordinate set S are given in the Detailed Description below.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only and are not intended to limit the scope of the present disclosure or the claims.

DETAILED DESCRIPTION

An example of the claimed piston will now be described more fully with reference to the accompanying drawings. Numerous specific details are set forth such as examples of specific components, devices, and methods, to provide a thorough understanding of embodiments of the present disclosure. It will be apparent to those skilled in the art that specific details need not be employed, that examples may be embodied in many different forms and that neither should be construed to limit the scope of the disclosure. In some examples, well-known processes, well-known device structures, and well-known technologies are not described in detail.

The terminology used herein is for the purpose of describing particular examples only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," "coupled to," or "extending from" another element or layer, it may be directly on, engaged, connected, coupled to, or extending from the other element or layer, or intervening elements or layers may be present. In contrast, when an element is referred to as being "directly on," "directly engaged to," "directly connected to," "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
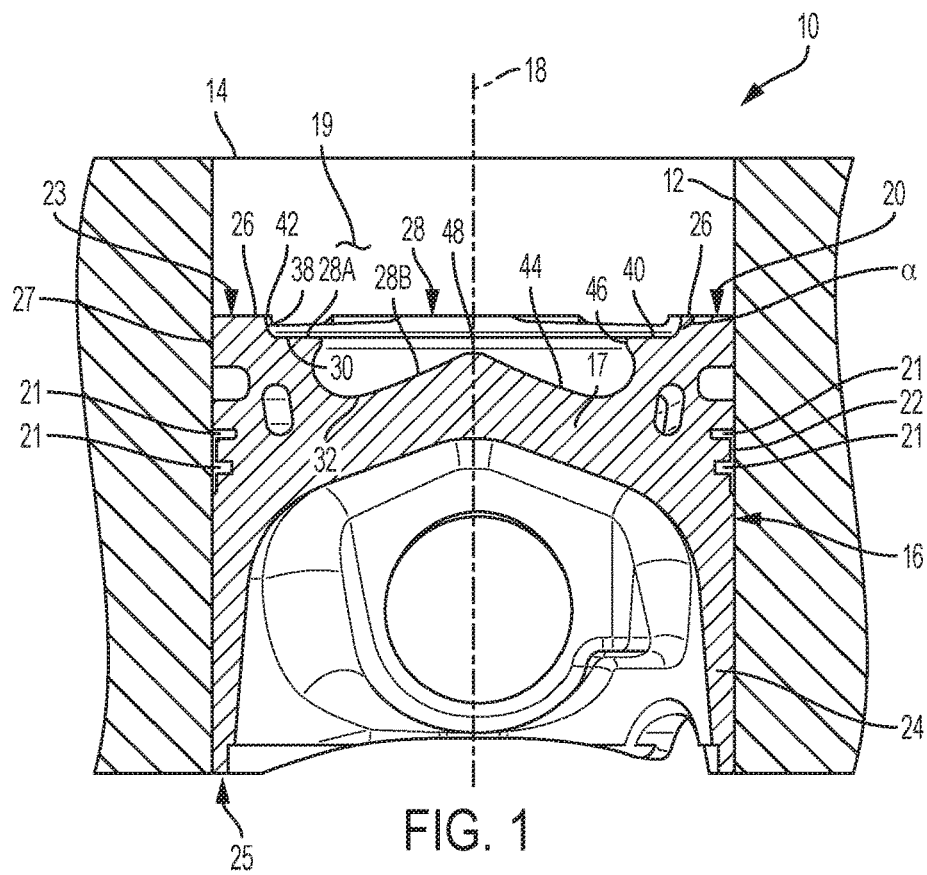
FIG. 1 is a cross-sectional view of a piston within a cylinder bore of an engine, in accordance with the principles of the present disclosure.
Figure 2:
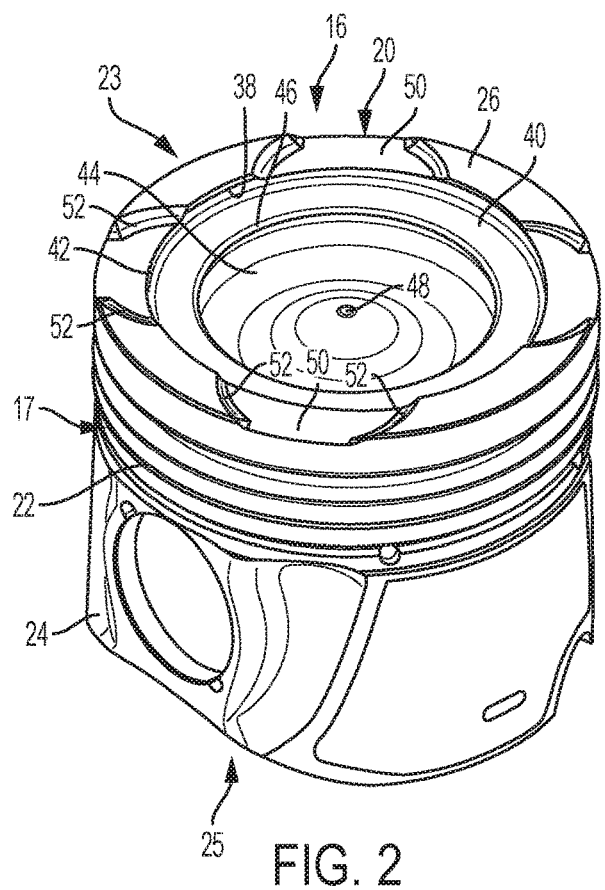
FIG. 2 is a perspective view of the piston of FIG. 1, according to the principles of the present disclosure.

Referring to FIG. 1 of the drawings, numeral 10 generally indicates a diesel engine including a cylinder 12 having a closed upper end 14. A piston 16 is reciprocable in the cylinder 12 along a central axis 18. The piston 16 is also shown in FIG. 2. A combustion chamber 19 is formed between the piston 16 and the closed end 14 of the cylinder 12. The piston 16 generally has a cylindrical-shaped piston body 17 centered on the central axis 18. The piston body 17 includes a crown 20, a ring belt 22 with piston ring grooves 21, and a skirt 24 extending axially from the ring belt 22. The crown 20 is disposed at a distal end 23 of the piston body 17, and the skirt 24 extends from a proximal end 25 of the piston body 17.

The crown 20 has a generally planar crown surface 26 extending inward from a side wall 27 and generally defining the top of the piston 16. A stepped circular combustion bowl 28 is recessed in the crown 20 within the crown surface 26. The piston body 17 has portions 30 defining an outer combustion bowl 28A and portions 32 defining an inner combustion bowl 28B within the piston body 17 through the crown 20; thus, the combustion bowl 28 includes the outer combustion bowl 28A and the inner combustion bowl 28B.

Figure 3:
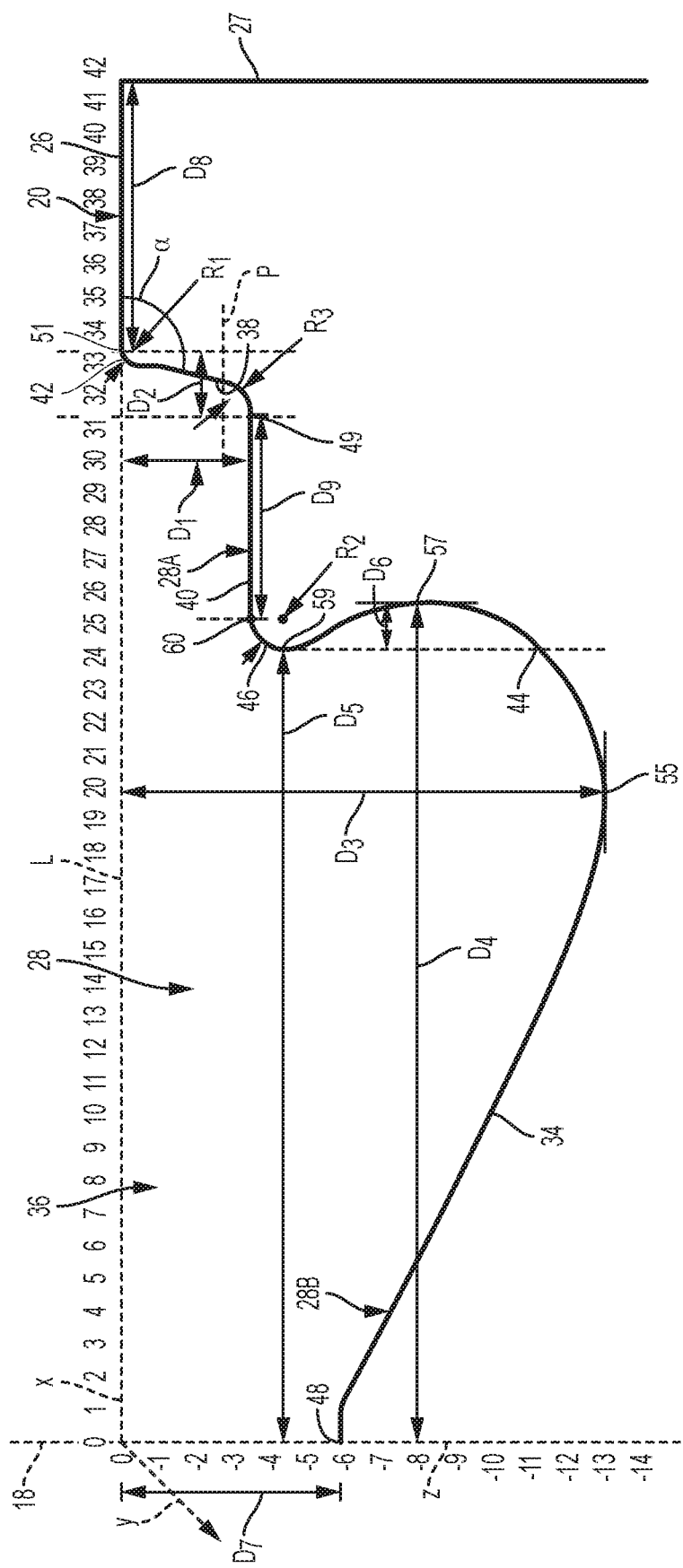
FIG. 3 is two-dimensional graph illustrating the two-dimensional cross-sectional profile line of the piston bowl of the piston of FIGS. 1-2, in accordance with the principles of the present disclosure.

FIG. 3 shows a two-dimensional cross-sectional profile line 34 of the combustion bowl 28 on a graph 36. The outer wall 27 of the piston 16 is represented as shown on the graph 36, and it should be understood that the profile line 34 is a top surface of the piston body 17 defining the combustion bowl 28, including the outer bowl 28A and the inner bowl 28B. With reference to FIG. 3 and continued reference to FIGS. 1-2, the outer bowl 28A includes a curved annular side wall 38 extending from the generally planar or flat crown surface 26. The curved annular side wall 38 is angled radially inward at an angle α with respect to the crown surface 26. In some examples, the angle α can be between 100° and 110°, by way of example. For example, the angle α can be 105° or about 105°.

The outer combustion bowl 28A has an annular flat shelf 40 extending radially inward from the curved annular side wall 38. The annular flat shelf 40 is recessed a distance $D_1$ from a line L that is coplanar with the crown surface 26. The distance $D_1$ may be in the range of 2.5 to 4.5 millimeters. For example, the distance $D_1$ could be 3.5 millimeters or about 3.5 millimeters. The inner combustion bowl 28B is recessed with respect to the annular flat shelf 40 of the outer combustion bowl 28A.

The curved annular side wall 38 has a slightly concave curved shape. The piston body 17 further defines in the profile line 34 an outer convex curved surface 42 connecting the curved annular side wall 38 to the crown surface 26. The outer convex curved surface 42 has a radius of curvature $R_1$ in the range of 0.25 to 0.75 millimeter. For example, the radius of curvature $R_1$ may be 0.5 millimeter or about 0.5 millimeter.

The piston body 17 defines a radius of curvature $R_3$ between the curved annular side wall 38 and the annular flat surface 40. The radius of curvatures $R_3$ could be in the range of 0.25 to 0.75 millimeter. For example, the radius of curvature $R_3$ could be 0.5 millimeter or about 0.5 millimeter.

The inner combustion bowl 28B is recessed relative to the annular flat surface 40 of the outer combustion bowl 28A and has an arcuate annular outer wall that curves radially outward from an upper edge forming a nose 46 and transitions radially inward to a mounded center 48 disposed along the central axis 18. Thus, the piston body 17 defines an annular valley surface 44 forming the inner combustion bowl 28B. The piston body 17 defines an inner convex curved surface (e.g., the nose 46) connecting the annular flat shelf 40 of the outer bowl 28A to the annular valley surface 44 of the inner bowl 28B. The inner convex curved surface or nose 46 has a radius of curvature $R_2$ in the range of 1 to 2 millimeters. For example, the radius of curvature $R_2$ may be 1.5 millimeters or about 1.5 millimeters.

A radial distance $D_2$ between the annular flat surface 40 and the crown surface 26 is in the range of 1.5 to 2 millimeters, wherein the radial distance $D_2$ is measured along a line P perpendicular to the central axis 18. The distance $D_2$ could be measured along any line perpendicular to the central axis 18, such as the line L that is coplanar with the crown surface 26. The distance $D_2$ is measured from an outer end 49 of the annular flat surface 40 to an inner end 51 of the crown surface 26. The outer end 49 of the annular flat surface 40 is coincident with an inner end of the curved annular side wall 38, and the inner end 51 of the crown surface 26 is coincident with an outer end of the outer convex curved surface 42. In some examples, $D_2$ could be 1.75 millimeters, or about 1.75 millimeters.

The inner combustion bowl 28B has a lowest point 55 that is a distance $D_3$ from the line L coplanar with the crown surface 26. In some forms, the distance $D_3$ may be 12 to 14 millimeters, and in some examples, the distance $D_3$ is 13.21 millimeters.

The inner combustion bowl 28B has a radially outermost point 57 that is a distance $D_4$ from the central axis 18 of the piston body 17. In some examples, the distance $D_4$ is in the range of 24 to 27 millimeters long. A radially innermost point 59 of the inner convex curved surface (nose 46) may be disposed a distance $D_5$ from the central axis 18. In some examples, the distance $D_5$ is in the range of 23 to 25 millimeters long. Thus, the radially innermost point 59 of the inner convex curved surface 46 is disposed radially inward of the radially outermost point 57 of the inner combustion bowl 28B by a radial distance $D_6$, where $D_6$ may be in the range of 1 to 2 millimeters in some examples. The radial distance $D_6$ is measured along a line perpendicular to the central axis 18, such as the line P or the line L.

The center 48 of the inner combustion bowl 28B is disposed a distance $D_7$ from the line L that is coplanar with the crown surface 26. The center 48 is located along the central axis 18 of the piston body 17. In some examples, the distance $D_7$ is in the range of 5 to 7 millimeters. For example, the distance $D_7$ may be 5.97 millimeters.

The outer convex curved surface 42, and more specifically, the outer end of the outer convex curved surface 42 that is coincident with the inner end 51 of the crown surface 26, may be disposed a distance $D_8$ from the outer edge 27 of the crown 20. The distance $D_8$ may be in the range of 8 to 10 millimeters, by way of example.

The annular flat shelf 40 has a radial length $D_9$ extending from the curved annular side wall 38 to the inner convex curved surface (or nose 46). The radial length $D_9$ begins at the outer end 49 of the annular flat surface 40 and ends at an inner end 60 of the annular flat surface 40 (where the inner end 60 is coincident with the beginning of the nose 46). In some examples, the radial length $D_9$ is 7 to 8 millimeters.

The double bowl design 28 is axisymmetric and therefore, it is only necessary to show the configuration of the bowl 28 to the right or left of the center axis 18 to illustrate the shape of the stepped bowl design 28. The three-dimensional configuration of the stepped combustion bowl 28 can be obtained by rotating the cross-sectional view of FIG. 3 360 degrees about the center axis 18. Thus, the piston body 17 ends up with a three-dimensional shape defined in an x-y-z coordinate system. The z-axis is coaxial with the central axis 18, and the x-axis is coaxial with, or parallel to, the line L coplanar with the crown surface 26, as shown in FIG. 3. The y-axis should be understood to come out of the page of the two-dimensional x-z plane shown in FIG. 3. Thus, the plane z=0 intersects the line L or plane that is coplanar with the crown surface 26 at 90 degrees. The center 48 of the piston body 17 intersects the z-axis.

Thus, the combustion bowl 28 is defined by the piston body 17 to be axisymmetric about the z-axis and has a partial two-dimensional cross-sectional configuration defined by the peripheral line 34 connecting coordinate points $(x_i, y_i, z_i)$ in the x-y-z coordinate space. The two-dimensional graph 36 in FIG. 3 is an x-z grid lying in the plane y=0. The ordinal variable "i" represents an integer between 1 and n, "n" being the total number of coordinate points along the peripheral line 34. In other words, the coordinate points along the peripheral line 34 includes points $(x_1, y_1, z_1)$, $(x_2, y_2, z_2)$, . . . $(x_n, y_n, z_n)$.

The coordinate points $(x_i, y_i, z_i)$ may include selected points that substantially coincide with a coordinate set S. The Coordinate Set S may include the following coordinates shown in Table 1. It should be understood that the Coordinate Set S is merely an example of the exact coordinates that may be used to form the peripheral line 34 of the combustion bowl 28. In addition, the coordinate points $(x_i, y_i, z_i)$ may be carried out to a greater or lesser number of decimal points than those shown in Table 1.

The value of the coordinate points $(x_i, y_i, z_i)$ represent lengths in units of millimeters. However, the coordinate points $(x_i, y_i, z_i)$ may be multiplied by any factor "f" such that the resultant combustion bowl has a cross-sectional peripheral line 34 that connects coordinate points $(fx_i, fy_i, fz_i)$ in the x-y-z coordinate space derived from the coordinate points $(x_i, y_i, z_i)$. The factor "f" may be any real number having a value greater than zero. Multiplying the coordinate set $(x_i, y_i, z_i)$ by the factor "f" results in a scaled version of the peripheral line 34 defined by the coordinate set $(x_i, y_i, z_i)$. Further, minor variations due to manufacturing are within the scope of the present disclosure.

TABLE 1

Coordinate Set S.
Coordinate Set S

| i | $x_i$ (mm) | $y_i$ (mm) | $z_i$ (mm) |
|---|---|---|---|
| 1 | 0 | 0 | −5.922 |
| 2 | 0.215 | 0 | −5.922 |
| 3 | 0.431 | 0 | −5.922 |
| 4 | 0.646 | 0 | −5.922 |
| 5 | 0.862 | 0 | −5.922 |
| 6 | 1.077 | 0 | −5.932 |
| 7 | 1.285 | 0 | −5.987 |
| 8 | 1.48 | 0 | −6.079 |
| 9 | 1.674 | 0 | −6.172 |
| 10 | 1.868 | 0 | −6.265 |
| 11 | 2.062 | 0 | −6.385 |
| 12 | 2.257 | 0 | −6.451 |
| 13 | 2.451 | 0 | −6.544 |
| 14 | 2.646 | 0 | −6.636 |
| 15 | 2.841 | 0 | −6.728 |
| 16 | 3.036 | 0 | −6.82 |
| 17 | 3.231 | 0 | −6.912 |
| 18 | 3.426 | 0 | −7.003 |
| 19 | 3.621 | 0 | −7.094 |
| 20 | 3.816 | 0 | −7.185 |
| 21 | 4.012 | 0 | −7.276 |
| 22 | 4.207 | 0 | −7.367 |
| 23 | 4.403 | 0 | −7.457 |
| 24 | 4.598 | 0 | −7.547 |
| 25 | 4.794 | 0 | −7.637 |
| 26 | 4.99 | 0 | −7.727 |
| 27 | 5.186 | 0 | −7.816 |
| 28 | 5.382 | 0 | −7.905 |
| 29 | 5.579 | 0 | −7.994 |
| 30 | 5.775 | 0 | −8.083 |

TABLE 1-continued

Coordinate Set S.
Coordinate Set S

| i | $x_i$ (mm) | $y_i$ (mm) | $z_i$ (mm) |
|---|---|---|---|
| 31 | 5.971 | 0 | −8.172 |
| 32 | 6.168 | 0 | −8.26 |
| 33 | 6.365 | 0 | −8.348 |
| 34 | 6.561 | 0 | −8.436 |
| 35 | 6.758 | 0 | −8.524 |
| 36 | 6.955 | 0 | −8.611 |
| 37 | 7.152 | 0 | −8.698 |
| 38 | 7.349 | 0 | −8.785 |
| 39 | 7.546 | 0 | −8.872 |
| 40 | 7.744 | 0 | −8.958 |
| 41 | 7.941 | 0 | −9.045 |
| 42 | 8.139 | 0 | −9.131 |
| 43 | 8.336 | 0 | −9.217 |
| 44 | 8.534 | 0 | −9.302 |
| 45 | 8.732 | 0 | −9.388 |
| 46 | 8.93 | 0 | −9.473 |
| 47 | 9.127 | 0 | −9.559 |
| 48 | 9.325 | 0 | −9.644 |
| 49 | 9.523 | 0 | −9.73 |
| 50 | 9.72 | 0 | −9.816 |
| 51 | 9.918 | 0 | −9.901 |
| 52 | 10.116 | 0 | −9.987 |
| 53 | 10.314 | 0 | −10.072 |
| 54 | 10.511 | 0 | −10.158 |
| 55 | 10.709 | 0 | −10.243 |
| 56 | 10.907 | 0 | −10.329 |
| 57 | 11.105 | 0 | −10.415 |
| 58 | 11.302 | 0 | −10.5 |
| 59 | 11.5 | 0 | −10.586 |
| 60 | 11.698 | 0 | −10.671 |
| 61 | 11.896 | 0 | −10.757 |
| 62 | 12.093 | 0 | −10.842 |
| 63 | 12.291 | 0 | −10.928 |
| 64 | 12.489 | 0 | −11.013 |
| 65 | 12.687 | 0 | −11.098 |
| 66 | 12.886 | 0 | −11.182 |
| 67 | 13.085 | 0 | −11.264 |
| 68 | 13.284 | 0 | −11.345 |
| 69 | 13.485 | 0 | −11.425 |
| 70 | 13.685 | 0 | −11.503 |
| 71 | 13.886 | 0 | −11.58 |
| 72 | 14.088 | 0 | −11.656 |
| 73 | 14.29 | 0 | −11.731 |
| 74 | 14.493 | 0 | −11.804 |
| 75 | 14.696 | 0 | −11.877 |
| 76 | 14.899 | 0 | −11.947 |
| 77 | 15.103 | 0 | −12.017 |
| 78 | 15.307 | 0 | −12.085 |
| 79 | 15.512 | 0 | −12.152 |
| 80 | 15.717 | 0 | −12.218 |
| 81 | 15.923 | 0 | −12.283 |
| 82 | 16.129 | 0 | −12.346 |
| 83 | 16.335 | 0 | −12.408 |
| 84 | 16.542 | 0 | −12.468 |
| 85 | 16.749 | 0 | −12.528 |
| 86 | 16.957 | 0 | −12.586 |
| 87 | 17.164 | 0 | −12.642 |
| 88 | 17.373 | 0 | −12.698 |
| 89 | 17.581 | 0 | −12.752 |
| 90 | 17.79 | 0 | −12.805 |
| 91 | 18 | 0 | −12.855 |
| 92 | 18.210 | 0 | −12.9 |
| 93 | 18.422 | 0 | −12.938 |
| 94 | 18.636 | 0 | −12.969 |
| 95 | 18.85 | 0 | −12.994 |
| 96 | 19.064 | 0 | −13.013 |
| 97 | 19.279 | 0 | −13.025 |
| 98 | 19.495 | 0 | −13.03 |
| 99 | 19.71 | 0 | −13.028 |
| 100 | 19.925 | 0 | −13.021 |
| 101 | 20.14 | 0 | −13.006 |
| 102 | 20.355 | 0 | −12.985 |
| 103 | 20.569 | 0 | −12.957 |
| 104 | 20.781 | 0 | −12.923 |
| 105 | 20.993 | 0 | −12.883 |
| 106 | 21.203 | 0 | −12.836 |
| 107 | 21.412 | 0 | −12.782 |
| 108 | 21.619 | 0 | −12.723 |
| 109 | 21.824 | 0 | −12.657 |
| 110 | 22.027 | 0 | −12.584 |
| 111 | 22.228 | 0 | −12.506 |
| 112 | 22.426 | 0 | −12.421 |
| 113 | 22.621 | 0 | −12.331 |
| 114 | 22.814 | 0 | −12.234 |
| 115 | 23.003 | 0 | −12.132 |
| 116 | 23.19 | 0 | −12.024 |
| 117 | 23.373 | 0 | −11.91 |
| 118 | 23.552 | 0 | −11.791 |
| 119 | 23.728 | 0 | −11.666 |
| 120 | 23.9 | 0 | −11.536 |
| 121 | 24.067 | 0 | −11.401 |
| 122 | 24.231 | 0 | −11.26 |
| 123 | 24.39 | 0 | −11.115 |
| 124 | 24.544 | 0 | −10.965 |
| 125 | 24.69 | 0 | −10.806 |
| 126 | 24.827 | 0 | −10.64 |
| 127 | 24.955 | 0 | −10.466 |
| 128 | 25.073 | 0 | −10.286 |
| 129 | 25.181 | 0 | −10.1 |
| 130 | 25.279 | 0 | −9.908 |
| 131 | 25.366 | 0 | −9.711 |
| 132 | 25.443 | 0 | −9.51 |
| 133 | 25.508 | 0 | −9.304 |
| 134 | 25.562 | 0 | −9.096 |
| 135 | 25.604 | 0 | −8.884 |
| 136 | 25.635 | 0 | −8.671 |
| 137 | 25.654 | 0 | −8.457 |
| 138 | 25.662 | 0 | −8.241 |
| 139 | 25.658 | 0 | −8.026 |
| 140 | 25.642 | 0 | −7.811 |
| 141 | 25.614 | 0 | −7.598 |
| 142 | 25.575 | 0 | −7.386 |
| 143 | 25.524 | 0 | −7.176 |
| 144 | 25.462 | 0 | −6.97 |
| 145 | 25.388 | 0 | −6.768 |
| 146 | 25.306 | 0 | −6.569 |
| 147 | 25.217 | 0 | −6.372 |
| 148 | 25.121 | 0 | −6.179 |
| 149 | 25.02 | 0 | −5.989 |
| 150 | 24.912 | 0 | −5.803 |
| 151 | 24.798 | 0 | −5.62 |
| 152 | 24.678 | 0 | −5.441 |
| 153 | 24.553 | 0 | −5.266 |
| 154 | 24.423 | 0 | −5.093 |
| 155 | 24.31 | 0 | −4.911 |
| 156 | 24.238 | 0 | −4.708 |
| 157 | 24.212 | 0 | −4.494 |
| 158 | 24.231 | 0 | −4.28 |
| 159 | 24.296 | 0 | −4.075 |
| 160 | 24.403 | 0 | −3.889 |
| 161 | 24.548 | 0 | −3.73 |
| 162 | 24.723 | 0 | −3.605 |
| 163 | 24.921 | 0 | −3.521 |
| 164 | 25.132 | 0 | −3.481 |
| 165 | 25.348 | 0 | −3.478 |
| 166 | 25.563 | 0 | −3.478 |
| 167 | 25.779 | 0 | −3.478 |
| 168 | 25.994 | 0 | −3.478 |
| 169 | 26.21 | 0 | −3.478 |
| 170 | 26.425 | 0 | −3.478 |
| 171 | 26.641 | 0 | −3.478 |
| 172 | 26.856 | 0 | −3.478 |
| 173 | 27.071 | 0 | −3.478 |
| 174 | 27.287 | 0 | −3.478 |
| 175 | 27.502 | 0 | −3.478 |
| 176 | 27.718 | 0 | −3.478 |
| 177 | 27.933 | 0 | −3.478 |
| 178 | 28.149 | 0 | −3.478 |
| 179 | 28.364 | 0 | −3.478 |
| 180 | 28.58 | 0 | −3.478 |

TABLE 1-continued

Coordinate Set S.
Coordinate Set S

| i | $x_i$ (mm) | $y_i$ (mm) | $z_i$ (mm) |
| --- | --- | --- | --- |
| 181 | 28.795 | 0 | −3.478 |
| 182 | 29.011 | 0 | −3.478 |
| 183 | 29.226 | 0 | −3.478 |
| 184 | 29.442 | 0 | −3.478 |
| 185 | 29.657 | 0 | −3.478 |
| 186 | 29.872 | 0 | −3.478 |
| 187 | 30.088 | 0 | −3.478 |
| 188 | 30.303 | 0 | −3.478 |
| 189 | 30.519 | 0 | −3.478 |
| 190 | 30.734 | 0 | −3.478 |
| 191 | 30.95 | 0 | −3.478 |
| 192 | 31.165 | 0 | −3.478 |
| 193 | 31.381 | 0 | −3.478 |
| 194 | 31.596 | 0 | −3.468 |
| 195 | 31.804 | 0 | −3.414 |
| 196 | 31.996 | 0 | −3.318 |
| 197 | 32.163 | 0 | −3.182 |
| 198 | 32.297 | 0 | −3.014 |
| 199 | 32.392 | 0 | −2.821 |
| 200 | 32.451 | 0 | −2.614 |
| 201 | 32.507 | 0 | −2.406 |
| 202 | 32.563 | 0 | −2.198 |
| 203 | 32.619 | 0 | −1.99 |
| 204 | 32.675 | 0 | −1.781 |
| 205 | 32.73 | 0 | −1.573 |
| 206 | 32.786 | 0 | −1.365 |
| 207 | 32.842 | 0 | −1.157 |
| 208 | 32.898 | 0 | −0.949 |
| 209 | 32.9 | 0 | −0.734 |
| 210 | 32.9 | 0 | −0.518 |
| 211 | 32.9 | 0 | −0.303 |
| 212 | 32.9 | 0 | −0.087 |
| 213 | 33.028 | 0 | 0 |
| 214 | 33.243 | 0 | 0 |
| 215 | 33.459 | 0 | 0 |
| 216 | 33.674 | 0 | 0 |
| 217 | 33.89 | 0 | 0 |
| 218 | 34.105 | 0 | 0 |
| 219 | 34.321 | 0 | 0 |
| 220 | 34.536 | 0 | 0 |
| 221 | 34.752 | 0 | 0 |
| 222 | 34.967 | 0 | 0 |
| 223 | 35.183 | 0 | 0 |
| 224 | 35.398 | 0 | 0 |
| 225 | 35.614 | 0 | 0 |
| 226 | 35.829 | 0 | 0 |
| 227 | 36.044 | 0 | 0 |
| 228 | 36.26 | 0 | 0 |
| 229 | 36.475 | 0 | 0 |
| 230 | 36.691 | 0 | 0 |
| 231 | 36.906 | 0 | 0 |
| 232 | 37.122 | 0 | 0 |
| 233 | 37.337 | 0 | 0 |
| 234 | 37.553 | 0 | 0 |
| 235 | 37.768 | 0 | 0 |
| 236 | 37.984 | 0 | 0 |
| 237 | 38.199 | 0 | 0 |
| 238 | 38.414 | 0 | 0 |
| 239 | 38.63 | 0 | 0 |
| 240 | 38.845 | 0 | 0 |
| 241 | 39.061 | 0 | 0 |
| 242 | 39.276 | 0 | 0 |
| 243 | 39.492 | 0 | 0 |
| 244 | 39.707 | 0 | 0 |
| 245 | 39.923 | 0 | 0 |
| 246 | 40.138 | 0 | 0 |
| 247 | 40.354 | 0 | 0 |
| 248 | 40.569 | 0 | 0 |
| 249 | 40.785 | 0 | 0 |
| 250 | 41 | 0 | 0 |

It should also be understood that, in some examples, the peripheral line 34 may be defined by fewer than all of the coordinates from the Coordinate Set S, such that only a subset of the Coordinate Set S is used to define the peripheral line 34. In one example, the peripheral line 34 is defined by the subset Sa of the Coordinate Set S. The subset Sa may include other coordinate points in addition to those shown in the subset Sa, which may include other coordinates from the Coordinate Set S, or other coordinates that are not part of the Coordinate Set S. The Coordinate Subset Sa is shown in Table 2.

TABLE 2

Coordinate Subset Sa.
Coordinate Set Sa

| i | $x_i$ (mm) | $y_i$ (mm) | $z_i$ (mm) |
| --- | --- | --- | --- |
| 147 | 25.217 | 0 | −6.372 |
| 154 | 24.423 | 0 | −5.093 |
| 157 | 24.212 | 0 | −4.494 |
| 160 | 24.403 | 0 | −3.889 |
| 165 | 25.348 | 0 | −3.478 |
| 193 | 31.381 | 0 | −3.478 |
| 197 | 32.163 | 0 | −3.182 |
| 202 | 32.563 | 0 | −2.198 |
| 208 | 32.898 | 0 | −0.949 |
| 212 | 32.9 | 0 | −0.087 |
| 213 | 33.028 | 0 | 0 |

Additional subsets may be used to further define the peripheral line 34, such as Coordinate Subset Sb, which is shown in Table 3.

TABLE 3

Coordinate Subset Sb.
Coordinate Set Sb

| i | $x_i$ (mm) | $y_i$ (mm) | $z_i$ (mm) |
| --- | --- | --- | --- |
| 1 | 0 | 0 | −5.922 |
| 6 | 1.077 | 0 | −5.932 |
| 8 | 1.480 | 0 | −6.079 |
| 80 | 15.717 | 0 | −12.218 |
| 89 | 17.581 | 0 | −12.752 |
| 93 | 18.422 | 0 | −12.938 |
| 98 | 19.495 | 0 | −13.03 |
| 103 | 20.569 | 0 | −12.957 |
| 111 | 22.228 | 0 | −12.506 |
| 120 | 23.9 | 0 | −11.536 |
| 129 | 25.181 | 0 | −10.1 |
| 138 | 25.662 | 0 | −8.241 |

Coordinate Subset Sa, shown in Table 2, only describes coordinate points in the upper bowl 28A and the step up to the crown 20. Coordinate Subset Sb, shown in Table 3, includes some coordinate points from the lower bowl 28B. Coordinate Set S, shown in Table 1, includes Subsets Sa and Sb and additional coordinates along the half piston.

Referring to FIG. 2, the crown 20 of the piston 16 can further include a plurality of radially outwardly extending reliefs 50 formed through the crown surface 26. The reliefs 50 can be equally spaced and have sidewalls 52 that narrow the reliefs 50 as the reliefs 50 extend radially outward. The fuel sprayed from a fuel injector (not shown) is sprayed from the central axis 18 out toward the annular outer wall 44 of the inner combustion bowl 28B.

The improved design of the sharp step combustion bowl 28 achieves simultaneous reduction of soot and $NO_x$ emissions by providing enhanced mixing of combustion products with excess air available in the cylinder 12. Further, the combustion bowl 28 achieves this reduction of soot and $NO_x$ emissions while also maintaining or improving fuel consumption using conventional fuel injection and air handling equipment. The reduction of soot further achieves the benefit of keeping the engine oil cleaner. Moreover, the combustion bowl 28 may potentially increase power density through the reduction of soot emissions, thereby allowing for higher fueling rates while still meeting governmentally mandated soot emission levels. The curved annular side wall 38 of the outer combustion bowl 28A limits excessive spray penetration at high loads.

The foregoing description has been provided for purposes of illustration and description. It is not intended to be exhaustive or to limit the disclosure. Individual elements or features of a particular example are generally not limited to that example, but, where applicable, are interchangeable and can be used in another example, even if not specifically shown or described. The same may also be varied in many ways. Such variations are not to be regarded as a departure from the disclosure, and all such modifications are intended to be included within the scope of the disclosure.

What is claimed is:

1. A piston for a diesel engine, comprising:
  a piston body having a skirt extending from a proximal end of the piston body; and
  a crown disposed at a distal end of the piston body and defining a crown surface, the piston body having portions defining an outer combustion bowl and an inner combustion bowl within the piston body through the crown, the outer combustion bowl having a curved annular side wall extending from the crown surface and an annular flat shelf extending from the curved annular side wall, the annular flat shelf being recessed a distance in the range of 2.5 to 4.5 millimeters from a line coplanar with the crown surface, the annular flat shelf being a continuous annulus that is symmetrically disposed about a central axis of the piston body, the inner combustion bowl being recessed with respect to the annular flat shelf of the outer combustion bowl, the piston body defining an outer convex curved surface connecting the curved annular side wall to the crown surface, the outer convex curved surface having a radius of curvature in the range of 0.25 to 0.75 millimeter.

2. The piston according to claim 1, the annular flat shelf being recessed a distance of about 3.5 millimeters from the line coplanar with the crown surface, the radius of curvature of the outer convex curved surface being about 0.5 millimeter.

3. The piston according to claim 1, the piston body defining an annular valley surface forming the inner combustion bowl, the piston body defining an inner convex curved surface connecting the annular flat shelf of the outer combustion bowl to the annular valley surface of the inner combustion bowl.

4. The piston according to claim 3, the inner convex curved surface having a radius of curvature in the range of 1 to 2 millimeters, the radius of curvature of the inner convex curved surface being about 1.5 millimeters.

5. The piston according to claim 4, a radial distance between the annular flat surface and the crown surface being in the range of 1.5 to 2 millimeters, the radial distance being measured along a line perpendicular to the central axis of the piston body.

6. The piston according to claim 5, a radius of curvature between the curved annular side wall and the annular flat surface being in the range of 0.25 to 0.75 millimeter.

7. The piston according to claim 6, the inner combustion bowl having a lowest point that is 12 to 14 millimeters from the line coplanar with the crown surface, the inner combustion bowl having a radially outermost point that is 24 to 27 millimeters from the central axis.

8. The piston according to claim 7, a center of the inner combustion bowl being disposed 5 to 7 millimeters from the line coplanar with the crown surface, the center being located along the central axis of the piston body.

9. The piston according to claim 8, a radially innermost point of the inner convex curved surface being disposed 23 to 25 millimeters from the central axis.

10. The piston according to claim 9, the radially innermost point of the inner convex curved surface being disposed radially inward of the radially outermost point of the inner combustion bowl by a radial distance of 1 to 2 millimeters, the radial distance being measured along a line perpendicular to the central axis.

11. The piston according to claim 10, the outer convex curved surface being disposed a distance of 8 to 10 millimeters from an outer edge of the crown.

12. The piston according to claim 11, the annular flat shelf having a radial length extending from the curved annular side wall to the inner convex curved surface, the radial length being 7 to 8 millimeters.

13. The piston according to claim 12, the curved annular side wall extending from the crown surface at an angle between 100 and 110 degrees.

14. The piston according to claim 13, the piston body having a three-dimensional shape defined in an x-y-z coordinate space, the z-axis being disposed along the central axis of the piston body and intersecting the line coplanar with the crown surface at 90 degrees, the inner and outer combustion bowls being defined by a two-dimensional cross-sectional profile line that begins at the central axis and ends along the crown surface to define a half cross-section of the piston body, the half cross-section being rotatable about the z-axis to form the three-dimensional shape of the piston body.

15. The piston according to claim 14, the two-dimensional cross-sectional profile line connecting a set of coordinate points in the x-y-z coordinate space, the set of coordinate points including coordinate points $(x_i, y_i, z_i)$ or coordinate points $(fx_i, fy_i, fz_i)$, f being any positive multiplier, the coordinate points $(x_i, y_i, z_i)$ including selected points that substantially coincide with a coordinate set S, the Coordinate Set S including the following subset Coordinate Set Sa:

| Coordinate Set Sa | | | |
|---|---|---|---|
| i | $x_i$ (mm) | $y_i$ (mm) | $z_i$ (mm) |
| 147 | 25.217 | 0 | −6.372 |
| 154 | 24.423 | 0 | −5.093 |
| 157 | 24.212 | 0 | −4.494 |
| 160 | 24.403 | 0 | −3.889 |
| 165 | 25.348 | 0 | −3.478 |
| 193 | 31.381 | 0 | −3.478 |
| 197 | 32.163 | 0 | −3.182 |
| 202 | 32.563 | 0 | −2.198 |
| 208 | 32.898 | 0 | −0.949 |
| 212 | 32.9 | 0 | −0.087 |
| 213 | 33.028 | 0 | 0. |

16. The piston according to claim 15, the Coordinate Set S further including the following subset Coordinate Set Sb:

| Coordinate Set Sb | | | |
|---|---|---|---|
| i | $x_i$ (mm) | $y_i$ (mm) | $z_i$ (mm) |
| 1 | 0 | 0 | −5.922 |
| 6 | 1.077 | 0 | −5.932 |
| 8 | 1.480 | 0 | −6.079 |

| Coordinate Set Sb | | | |
|---|---|---|---|
| i | $x_i$ (mm) | $y_i$ (mm) | $z_i$ (mm) |
| 80 | 15.717 | 0 | −12.218 |
| 89 | 17.581 | 0 | −12.752 |
| 93 | 18.422 | 0 | −12.938 |
| 98 | 19.495 | 0 | −13.03 |
| 103 | 20.569 | 0 | −12.957 |
| 111 | 22.228 | 0 | −12.506 |
| 120 | 23.9 | 0 | −11.536 |
| 129 | 25.181 | 0 | −10.1 |
| 138 | 25.662 | 0 | −8.241. |

17. The piston according to claim 16, the Coordinate Set S further including the following subset Coordinate Set Sc:

| Coordinate Set Sc | | | |
|---|---|---|---|
| i | $x_i$ (mm) | $y_i$ (mm) | $z_i$ (mm) |
| 2 | 0.215 | 0 | −5.922 |
| 3 | 0.431 | 0 | −5.922 |
| 4 | 0.646 | 0 | −5.922 |
| 5 | 0.862 | 0 | −5.922 |
| 7 | 1.285 | 0 | −5.987 |
| 9 | 1.674 | 0 | −6.172 |
| 10 | 1.868 | 0 | −6.265 |
| 11 | 2.062 | 0 | −6.385 |
| 12 | 2.257 | 0 | −6.451 |
| 13 | 2.451 | 0 | −6.544 |
| 14 | 2.646 | 0 | −6.636 |
| 15 | 2.841 | 0 | −6.728 |
| 16 | 3.036 | 0 | −6.82 |
| 17 | 3.231 | 0 | −6.912 |
| 18 | 3.426 | 0 | −7.003 |
| 19 | 3.621 | 0 | −7.094 |
| 20 | 3.816 | 0 | −7.185 |
| 21 | 4.012 | 0 | −7.276 |
| 22 | 4.207 | 0 | −7.367 |
| 23 | 4.403 | 0 | −7.457 |
| 24 | 4.598 | 0 | −7.547 |
| 25 | 4.794 | 0 | −7.637 |
| 26 | 4.99 | 0 | −7.727 |
| 27 | 5.186 | 0 | −7.816 |
| 28 | 5.382 | 0 | −7.905 |
| 29 | 5.579 | 0 | −7.994 |
| 30 | 5.775 | 0 | −8.083 |
| 31 | 5.971 | 0 | −8.172 |
| 32 | 6.168 | 0 | −8.26 |
| 33 | 6.365 | 0 | −8.348 |
| 34 | 6.561 | 0 | −8.436 |
| 35 | 6.758 | 0 | −8.524 |
| 36 | 6.955 | 0 | −8.611 |
| 37 | 7.152 | 0 | −8.698 |
| 38 | 7.349 | 0 | −8.785 |
| 39 | 7.546 | 0 | −8.872 |
| 40 | 7.744 | 0 | −8.958 |
| 41 | 7.941 | 0 | −9.045 |
| 42 | 8.139 | 0 | −9.131 |
| 43 | 8.336 | 0 | −9.217 |
| 44 | 8.534 | 0 | −9.302 |
| 45 | 8.732 | 0 | −9.388 |
| 46 | 8.93 | 0 | −9.473 |
| 47 | 9.127 | 0 | −9.559 |
| 48 | 9.325 | 0 | −9.644 |
| 49 | 9.523 | 0 | −9.73 |
| 50 | 9.72 | 0 | −9.816 |
| 51 | 9.918 | 0 | −9.901 |
| 52 | 10.116 | 0 | −9.987 |
| 53 | 10.314 | 0 | −10.072 |
| 54 | 10.511 | 0 | −10.158 |
| 55 | 10.709 | 0 | −10.243 |
| 56 | 10.907 | 0 | −10.329 |
| 57 | 11.105 | 0 | −10.415 |
| 58 | 11.302 | 0 | −10.5 |
| 59 | 11.5 | 0 | −10.586 |
| 60 | 11.698 | 0 | −10.671 |
| 61 | 11.896 | 0 | −10.757 |
| 62 | 12.093 | 0 | −10.842 |
| 63 | 12.291 | 0 | −10.928 |
| 64 | 12.489 | 0 | −11.013 |
| 65 | 12.687 | 0 | −11.098 |
| 66 | 12.886 | 0 | −11.182 |
| 67 | 13.085 | 0 | −11.264 |
| 68 | 13.284 | 0 | −11.345 |
| 69 | 13.485 | 0 | −11.425 |
| 70 | 13.685 | 0 | −11.503 |
| 71 | 13.886 | 0 | −11.58 |
| 72 | 14.088 | 0 | −11.656 |
| 73 | 14.29 | 0 | −11.731 |
| 74 | 14.493 | 0 | −11.804 |
| 75 | 14.696 | 0 | −11.877 |
| 76 | 14.899 | 0 | −11.947 |
| 77 | 15.103 | 0 | −12.017 |
| 78 | 15.307 | 0 | −12.085 |
| 79 | 15.512 | 0 | −12.152 |
| 81 | 15.923 | 0 | −12.283 |
| 82 | 16.129 | 0 | −12.346 |
| 83 | 16.335 | 0 | −12.408 |
| 84 | 16.542 | 0 | −12.468 |
| 85 | 16.749 | 0 | −12.528 |
| 86 | 16.957 | 0 | −12.586 |
| 87 | 17.164 | 0 | −12.642 |
| 88 | 17.373 | 0 | −12.698 |
| 90 | 17.79 | 0 | −12.805 |
| 91 | 18 | 0 | −12.855 |
| 92 | 18.210 | 0 | −12.9 |
| 94 | 18.636 | 0 | −12.969 |
| 95 | 18.85 | 0 | −12.994 |
| 96 | 19.064 | 0 | −13.013 |
| 97 | 19.279 | 0 | −13.025 |
| 99 | 19.71 | 0 | −13.028 |
| 100 | 19.925 | 0 | −13.021 |
| 101 | 20.14 | 0 | −13.006 |
| 102 | 20.355 | 0 | −12.985 |
| 104 | 20.781 | 0 | −12.923 |
| 105 | 20.993 | 0 | −12.883 |
| 106 | 21.203 | 0 | −12.836 |
| 107 | 21.412 | 0 | −12.782 |
| 108 | 21.619 | 0 | −12.723 |
| 109 | 21.824 | 0 | −12.657 |
| 110 | 22.027 | 0 | −12.584 |
| 112 | 22.426 | 0 | −12.421 |
| 113 | 22.621 | 0 | −12.331 |
| 114 | 22.814 | 0 | −12.234 |
| 115 | 23.003 | 0 | −12.132 |
| 116 | 23.19 | 0 | −12.024 |
| 117 | 23.373 | 0 | −11.91 |
| 118 | 23.552 | 0 | −11.791 |
| 119 | 23.728 | 0 | −11.666 |
| 121 | 24.067 | 0 | −11.401 |
| 122 | 24.231 | 0 | −11.26 |
| 123 | 24.39 | 0 | −11.115 |
| 124 | 24.544 | 0 | −10.965 |
| 125 | 24.69 | 0 | −10.806 |
| 126 | 24.827 | 0 | −10.64 |
| 127 | 24.955 | 0 | −10.466 |
| 128 | 25.073 | 0 | −10.286 |
| 130 | 25.279 | 0 | −9.908 |
| 131 | 25.366 | 0 | −9.711 |
| 132 | 25.443 | 0 | −9.51 |
| 133 | 25.508 | 0 | −9.304 |
| 134 | 25.562 | 0 | −9.096 |
| 135 | 25.604 | 0 | −8.884 |
| 136 | 25.635 | 0 | −8.671 |
| 137 | 25.654 | 0 | −8.457 |
| 139 | 25.658 | 0 | −8.026 |
| 140 | 25.642 | 0 | −7.811 |
| 141 | 25.614 | 0 | −7.598 |
| 142 | 25.575 | 0 | −7.386 |
| 143 | 25.524 | 0 | −7.176 |

Coordinate Set Sc

| i | $x_i$ (mm) | $y_i$ (mm) | $z_i$ (mm) |
|---|---|---|---|
| 144 | 25.462 | 0 | −6.97 |
| 145 | 25.388 | 0 | −6.768 |
| 146 | 25.306 | 0 | −6.569 |
| 148 | 25.121 | 0 | −6.179 |
| 149 | 25.02 | 0 | −5.989 |
| 150 | 24.912 | 0 | −5.803 |
| 151 | 24.798 | 0 | −5.62 |
| 152 | 24.678 | 0 | −5.441 |
| 153 | 24.553 | 0 | −5.266 |
| 155 | 24.31 | 0 | −4.911 |
| 156 | 24.238 | 0 | −4.708 |
| 158 | 24.231 | 0 | −4.28 |
| 159 | 24.296 | 0 | −4.075 |
| 161 | 24.548 | 0 | −3.73 |
| 162 | 24.723 | 0 | −3.605 |
| 163 | 24.921 | 0 | −3.521 |
| 164 | 25.132 | 0 | −3.481 |
| 166 | 25.563 | 0 | −3.478 |
| 167 | 25.779 | 0 | −3.478 |
| 168 | 25.994 | 0 | −3.478 |
| 169 | 26.21 | 0 | −3.478 |
| 170 | 26.425 | 0 | −3.478 |
| 171 | 26.641 | 0 | −3.478 |
| 172 | 26.856 | 0 | −3.478 |
| 173 | 27.071 | 0 | −3.478 |
| 174 | 27.287 | 0 | −3.478 |
| 175 | 27.502 | 0 | −3.478 |
| 176 | 27.718 | 0 | −3.478 |
| 177 | 27.933 | 0 | −3.478 |
| 178 | 28.149 | 0 | −3.478 |
| 179 | 28.364 | 0 | −3.478 |
| 180 | 28.58 | 0 | −3.478 |
| 181 | 28.795 | 0 | −3.478 |
| 182 | 29.011 | 0 | −3.478 |
| 183 | 29.226 | 0 | −3.478 |
| 184 | 29.442 | 0 | −3.478 |
| 185 | 29.657 | 0 | −3.478 |
| 186 | 29.872 | 0 | −3.478 |
| 187 | 30.088 | 0 | −3.478 |
| 188 | 30.303 | 0 | −3.478 |
| 189 | 30.519 | 0 | −3.478 |
| 190 | 30.734 | 0 | −3.478 |
| 191 | 30.95 | 0 | −3.478 |
| 192 | 31.165 | 0 | −3.478 |
| 194 | 31.596 | 0 | −3.468 |
| 195 | 31.804 | 0 | −3.414 |
| 196 | 31.996 | 0 | −3.318 |
| 198 | 32.297 | 0 | −3.014 |
| 199 | 32.392 | 0 | −2.821 |
| 200 | 32.451 | 0 | −2.614 |
| 201 | 32.507 | 0 | −2.406 |
| 203 | 32.619 | 0 | −1.99 |
| 204 | 32.675 | 0 | −1.781 |
| 205 | 32.73 | 0 | −1.573 |
| 206 | 32.786 | 0 | −1.365 |
| 207 | 32.842 | 0 | −1.157 |
| 209 | 32.9 | 0 | −0.734 |
| 210 | 32.9 | 0 | −0.518 |
| 211 | 32.9 | 0 | −0.303 |
| 214 | 33.243 | 0 | 0 |
| 215 | 33.459 | 0 | 0 |
| 216 | 33.674 | 0 | 0 |
| 217 | 33.89 | 0 | 0 |
| 218 | 34.105 | 0 | 0 |
| 219 | 34.321 | 0 | 0 |
| 220 | 34.536 | 0 | 0 |
| 221 | 34.752 | 0 | 0 |
| 222 | 34.967 | 0 | 0 |
| 223 | 35.183 | 0 | 0 |
| 224 | 35.398 | 0 | 0 |
| 225 | 35.614 | 0 | 0 |
| 226 | 35.829 | 0 | 0 |
| 227 | 36.044 | 0 | 0 |
| 228 | 36.26 | 0 | 0 |
| 229 | 36.475 | 0 | 0 |
| 230 | 36.691 | 0 | 0 |
| 231 | 36.906 | 0 | 0 |
| 232 | 37.122 | 0 | 0 |
| 233 | 37.337 | 0 | 0 |
| 234 | 37.553 | 0 | 0 |
| 235 | 37.768 | 0 | 0 |
| 236 | 37.984 | 0 | 0 |
| 237 | 38.199 | 0 | 0 |
| 238 | 38.414 | 0 | 0 |
| 239 | 38.63 | 0 | 0 |
| 240 | 38.845 | 0 | 0 |
| 241 | 39.061 | 0 | 0 |
| 242 | 39.276 | 0 | 0 |
| 243 | 39.492 | 0 | 0 |
| 244 | 39.707 | 0 | 0 |
| 245 | 39.923 | 0 | 0 |
| 246 | 40.138 | 0 | 0 |
| 247 | 40.354 | 0 | 0 |
| 248 | 40.569 | 0 | 0 |
| 249 | 40.785 | 0 | 0 |
| 250 | 41 | 0 | 0. |

18. The piston according to claim 1, the piston body having a three-dimensional shape defined in an x-y-z coordinate space, the z-axis being disposed along a central axis of the piston body and intersecting the line coplanar with the crown surface at 90 degrees, the inner and outer combustion bowls being defined by a two-dimensional cross-sectional profile line that begins at a center of the piston body to define a half cross-section of the piston body, the half cross-section being rotatable about the z-axis to form the three-dimensional shape of the piston body, the two-dimensional cross-sectional profile line connecting a set of coordinate points in the x-y-z coordinate space, the set of coordinate points including coordinate points $(x_i, y_i, z_i)$ or coordinate points $(fx_i, fy_i, fz_i)$, f being any positive multiplier, the coordinate points $(x_i, y_i, z_i)$ including selected points that substantially coincide with a coordinate set S, the Coordinate Set S including the following subset Coordinate Set S1:

Coordinate Set S1

| i | $x_i$ (mm) | $y_i$ (mm) | $z_i$ (mm) |
|---|---|---|---|
| 1 | 0 | 0 | −5.922 |
| 6 | 1.077 | 0 | −5.932 |
| 8 | 1.480 | 0 | −6.079 |
| 80 | 15.717 | 0 | −12.218 |
| 89 | 17.581 | 0 | −12.752 |
| 93 | 18.422 | 0 | −12.938 |
| 98 | 19.495 | 0 | −13.03 |
| 103 | 20.569 | 0 | −12.957 |
| 111 | 22.228 | 0 | −12.506 |
| 120 | 23.9 | 0 | −11.536 |
| 129 | 25.181 | 0 | −10.1 |
| 138 | 25.662 | 0 | −8.241 |
| 147 | 25.217 | 0 | −6.372 |
| 154 | 24.423 | 0 | −5.093 |
| 157 | 24.212 | 0 | −4.494 |
| 160 | 24.403 | 0 | −3.889 |
| 165 | 25.348 | 0 | −3.478 |
| 193 | 31.381 | 0 | −3.478 |
| 197 | 32.163 | 0 | −3.182 |
| 202 | 32.563 | 0 | −2.198 |
| 208 | 32.898 | 0 | −0.949 |
| 212 | 32.9 | 0 | −0.087 |
| 213 | 33.028 | 0 | 0. |

19. The piston according to claim 18, the Coordinate Set S further including the following subset Coordinate Set S2:

| Coordinate Set S2 | | | |
|---|---|---|---|
| i | $x_i$ (mm) | $y_i$ (mm) | $z_i$ (mm) |
| 2 | 0.215 | 0 | −5.922 |
| 3 | 0.431 | 0 | −5.922 |
| 4 | 0.646 | 0 | −5.922 |
| 5 | 0.862 | 0 | −5.922 |
| 7 | 1.285 | 0 | −5.987 |
| 9 | 1.674 | 0 | −6.172 |
| 10 | 1.868 | 0 | −6.265 |
| 11 | 2.062 | 0 | −6.385 |
| 12 | 2.257 | 0 | −6.451 |
| 13 | 2.451 | 0 | −6.544 |
| 14 | 2.646 | 0 | −6.636 |
| 15 | 2.841 | 0 | −6.728 |
| 16 | 3.036 | 0 | −6.82 |
| 17 | 3.231 | 0 | −6.912 |
| 18 | 3.426 | 0 | −7.003 |
| 19 | 3.621 | 0 | −7.094 |
| 20 | 3.816 | 0 | −7.185 |
| 21 | 4.012 | 0 | −7.276 |
| 22 | 4.207 | 0 | −7.367 |
| 23 | 4.403 | 0 | −7.457 |
| 24 | 4.598 | 0 | −7.547 |
| 25 | 4.794 | 0 | −7.637 |
| 26 | 4.99 | 0 | −7.727 |
| 27 | 5.186 | 0 | −7.816 |
| 28 | 5.382 | 0 | −7.905 |
| 29 | 5.579 | 0 | −7.994 |
| 30 | 5.775 | 0 | −8.083 |
| 31 | 5.971 | 0 | −8.172 |
| 32 | 6.168 | 0 | −8.26 |
| 33 | 6.365 | 0 | −8.348 |
| 34 | 6.561 | 0 | −8.436 |
| 35 | 6.758 | 0 | −8.524 |
| 36 | 6.955 | 0 | −8.611 |
| 37 | 7.152 | 0 | −8.698 |
| 38 | 7.349 | 0 | −8.785 |
| 39 | 7.546 | 0 | −8.872 |
| 40 | 7.744 | 0 | −8.958 |
| 41 | 7.941 | 0 | −9.045 |
| 42 | 8.139 | 0 | −9.131 |
| 43 | 8.336 | 0 | −9.217 |
| 44 | 8.534 | 0 | −9.302 |
| 45 | 8.732 | 0 | −9.388 |
| 46 | 8.93 | 0 | −9.473 |
| 47 | 9.127 | 0 | −9.559 |
| 48 | 9.325 | 0 | −9.644 |
| 49 | 9.523 | 0 | −9.73 |
| 50 | 9.72 | 0 | −9.816 |
| 51 | 9.918 | 0 | −9.901 |
| 52 | 10.116 | 0 | −9.987 |
| 53 | 10.314 | 0 | −10.072 |
| 54 | 10.511 | 0 | −10.158 |
| 55 | 10.709 | 0 | −10.243 |
| 56 | 10.907 | 0 | −10.329 |
| 57 | 11.105 | 0 | −10.415 |
| 58 | 11.302 | 0 | −10.5 |
| 59 | 11.5 | 0 | −10.586 |
| 60 | 11.698 | 0 | −10.671 |
| 61 | 11.896 | 0 | −10.757 |
| 62 | 12.093 | 0 | −10.842 |
| 63 | 12.291 | 0 | −10.928 |
| 64 | 12.489 | 0 | −11.013 |
| 65 | 12.687 | 0 | −11.098 |
| 66 | 12.886 | 0 | −11.182 |
| 67 | 13.085 | 0 | −11.264 |
| 68 | 13.284 | 0 | −11.345 |
| 69 | 13.485 | 0 | −11.425 |
| 70 | 13.685 | 0 | −11.503 |
| 71 | 13.886 | 0 | −11.58 |
| 72 | 14.088 | 0 | −11.656 |
| 73 | 14.29 | 0 | −11.731 |
| 74 | 14.493 | 0 | −11.804 |
| 75 | 14.696 | 0 | −11.877 |
| 76 | 14.899 | 0 | −11.947 |
| 77 | 15.103 | 0 | −12.017 |
| 78 | 15.307 | 0 | −12.085 |
| 79 | 15.512 | 0 | −12.152 |
| 81 | 15.923 | 0 | −12.283 |
| 82 | 16.129 | 0 | −12.346 |
| 83 | 16.335 | 0 | −12.408 |
| 84 | 16.542 | 0 | −12.468 |
| 85 | 16.749 | 0 | −12.528 |
| 86 | 16.957 | 0 | −12.586 |
| 87 | 17.164 | 0 | −12.642 |
| 88 | 17.373 | 0 | −12.698 |
| 90 | 17.79 | 0 | −12.805 |
| 91 | 18 | 0 | −12.855 |
| 92 | 18.210 | 0 | −12.9 |
| 94 | 18.636 | 0 | −12.969 |
| 95 | 18.85 | 0 | −12.994 |
| 96 | 19.064 | 0 | −13.013 |
| 97 | 19.279 | 0 | −13.025 |
| 99 | 19.71 | 0 | −13.028 |
| 100 | 19.925 | 0 | −13.021 |
| 101 | 20.14 | 0 | −13.006 |
| 102 | 20.355 | 0 | −12.985 |
| 104 | 20.781 | 0 | −12.923 |
| 105 | 20.993 | 0 | −12.883 |
| 106 | 21.203 | 0 | −12.836 |
| 107 | 21.412 | 0 | −12.782 |
| 108 | 21.619 | 0 | −12.723 |
| 109 | 21.824 | 0 | −12.657 |
| 110 | 22.027 | 0 | −12.584 |
| 112 | 22.426 | 0 | −12.421 |
| 113 | 22.621 | 0 | −12.331 |
| 114 | 22.814 | 0 | −12.234 |
| 115 | 23.003 | 0 | −12.132 |
| 116 | 23.19 | 0 | −12.024 |
| 117 | 23.373 | 0 | −11.91 |
| 118 | 23.552 | 0 | −11.791 |
| 119 | 23.728 | 0 | −11.666 |
| 121 | 24.067 | 0 | −11.401 |
| 122 | 24.231 | 0 | −11.26 |
| 123 | 24.39 | 0 | −11.115 |
| 124 | 24.544 | 0 | −10.965 |
| 125 | 24.69 | 0 | −10.806 |
| 126 | 24.827 | 0 | −10.64 |
| 127 | 24.955 | 0 | −10.466 |
| 128 | 25.073 | 0 | −10.286 |
| 130 | 25.279 | 0 | −9.908 |
| 131 | 25.366 | 0 | −9.711 |
| 132 | 25.443 | 0 | −9.51 |
| 133 | 25.508 | 0 | −9.304 |
| 134 | 25.562 | 0 | −9.096 |
| 135 | 25.604 | 0 | −8.884 |
| 136 | 25.635 | 0 | −8.671 |
| 137 | 25.654 | 0 | −8.457 |
| 139 | 25.658 | 0 | −8.026 |
| 140 | 25.642 | 0 | −7.811 |
| 141 | 25.614 | 0 | −7.598 |
| 142 | 25.575 | 0 | −7.386 |
| 143 | 25.524 | 0 | −7.176 |
| 144 | 25.462 | 0 | −6.97 |
| 145 | 25.388 | 0 | −6.768 |
| 146 | 25.306 | 0 | −6.569 |
| 148 | 25.121 | 0 | −6.179 |
| 149 | 25.02 | 0 | −5.989 |
| 150 | 24.912 | 0 | −5.803 |
| 151 | 24.798 | 0 | −5.62 |
| 152 | 24.678 | 0 | −5.441 |
| 153 | 24.553 | 0 | −5.266 |
| 155 | 24.31 | 0 | −4.911 |
| 156 | 24.238 | 0 | −4.708 |
| 158 | 24.231 | 0 | −4.28 |
| 159 | 24.296 | 0 | −4.075 |
| 161 | 24.548 | 0 | −3.73 |
| 162 | 24.723 | 0 | −3.605 |
| 163 | 24.921 | 0 | −3.521 |
| 164 | 25.132 | 0 | −3.481 |
| 166 | 25.563 | 0 | −3.478 |
| 167 | 25.779 | 0 | −3.478 |
| 168 | 25.994 | 0 | −3.478 |
| 169 | 26.21 | 0 | −3.478 |

Coordinate Set S2

| i | $x_i$ (mm) | $y_i$ (mm) | $z_i$ (mm) |
|---|---|---|---|
| 170 | 26.425 | 0 | −3.478 |
| 171 | 26.641 | 0 | −3.478 |
| 172 | 26.856 | 0 | −3.478 |
| 173 | 27.071 | 0 | −3.478 |
| 174 | 27.287 | 0 | −3.478 |
| 175 | 27.502 | 0 | −3.478 |
| 176 | 27.718 | 0 | −3.478 |
| 177 | 27.933 | 0 | −3.478 |
| 178 | 28.149 | 0 | −3.478 |
| 179 | 28.364 | 0 | −3.478 |
| 180 | 28.58 | 0 | −3.478 |
| 181 | 28.795 | 0 | −3.478 |
| 182 | 29.011 | 0 | −3.478 |
| 183 | 29.226 | 0 | −3.478 |
| 184 | 29.442 | 0 | −3.478 |
| 185 | 29.657 | 0 | −3.478 |
| 186 | 29.872 | 0 | −3.478 |
| 187 | 30.088 | 0 | −3.478 |
| 188 | 30.303 | 0 | −3.478 |
| 189 | 30.519 | 0 | −3.478 |
| 190 | 30.734 | 0 | −3.478 |
| 191 | 30.95 | 0 | −3.478 |
| 192 | 31.165 | 0 | −3.478 |
| 194 | 31.596 | 0 | −3.468 |
| 195 | 31.804 | 0 | −3.414 |
| 196 | 31.996 | 0 | −3.318 |
| 198 | 32.297 | 0 | −3.014 |
| 199 | 32.392 | 0 | −2.821 |
| 200 | 32.451 | 0 | −2.614 |
| 201 | 32.507 | 0 | −2.406 |
| 203 | 32.619 | 0 | −1.99 |
| 204 | 32.675 | 0 | −1.781 |
| 205 | 32.73 | 0 | −1.573 |
| 206 | 32.786 | 0 | −1.365 |
| 207 | 32.842 | 0 | −1.157 |
| 209 | 32.9 | 0 | −0.734 |
| 210 | 32.9 | 0 | −0.518 |
| 211 | 32.9 | 0 | −0.303 |
| 214 | 33.243 | 0 | 0 |
| 215 | 33.459 | 0 | 0 |
| 216 | 33.674 | 0 | 0 |
| 217 | 33.89 | 0 | 0 |
| 218 | 34.105 | 0 | 0 |
| 219 | 34.321 | 0 | 0 |
| 220 | 34.536 | 0 | 0 |
| 221 | 34.752 | 0 | 0 |
| 222 | 34.967 | 0 | 0 |
| 223 | 35.183 | 0 | 0 |
| 224 | 35.398 | 0 | 0 |
| 225 | 35.614 | 0 | 0 |
| 226 | 35.829 | 0 | 0 |
| 227 | 36.044 | 0 | 0 |
| 228 | 36.26 | 0 | 0 |
| 229 | 36.475 | 0 | 0 |
| 230 | 36.691 | 0 | 0 |
| 231 | 36.906 | 0 | 0 |
| 232 | 37.122 | 0 | 0 |
| 233 | 37.337 | 0 | 0 |
| 234 | 37.553 | 0 | 0 |
| 235 | 37.768 | 0 | 0 |
| 236 | 37.984 | 0 | 0 |
| 237 | 38.199 | 0 | 0 |
| 238 | 38.414 | 0 | 0 |
| 239 | 38.63 | 0 | 0 |
| 240 | 38.845 | 0 | 0 |
| 241 | 39.061 | 0 | 0 |
| 242 | 39.276 | 0 | 0 |
| 243 | 39.492 | 0 | 0 |
| 244 | 39.707 | 0 | 0 |
| 245 | 39.923 | 0 | 0 |
| 246 | 40.138 | 0 | 0 |
| 247 | 40.354 | 0 | 0 |
| 248 | 40.569 | 0 | 0 |
| 249 | 40.785 | 0 | 0 |
| 250 | 41 | 0 | 0. |

20. The piston according to claim 1, each of the outer combustion bowl and the inner combustion bowl being axisymmetric about a central axis of the piston body, wherein each of the outer combustion bowl and the inner combustion bowl are defined by a two-dimensional profile that is rotated about the central axis.

* * * * *